(12) United States Patent
Neelakantan et al.

(10) Patent No.: US 10,167,906 B2
(45) Date of Patent: Jan. 1, 2019

(54) CLUTCH ASSEMBLY HAVING A HYDRAULICALLY ACTUATE PISTON AND LATCHING DEVICE

(71) Applicant: GM Global Technology Operations LLC, Detroit, MI (US)

(72) Inventors: Vijay A. Neelakantan, Rochester Hills, MI (US); Joseph R. Littlefield, Sterling Heights, MI (US); Lawrence A. Kaminsky, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 15/214,041

(22) Filed: Jul. 19, 2016

(65) Prior Publication Data

US 2018/0023635 A1  Jan. 25, 2018

(51) Int. Cl.
| | |
|---|---|
| *F16D 11/00* | (2006.01) |
| *F16D 25/061* | (2006.01) |
| *F16D 25/08* | (2006.01) |
| *F16D 11/14* | (2006.01) |
| *F16D 13/52* | (2006.01) |
| *F16H 1/28* | (2006.01) |
| *F16D 121/04* | (2012.01) |
| *F16D 121/14* | (2012.01) |
| *F16D 127/06* | (2012.01) |

(52) U.S. Cl.
CPC ............ *F16D 25/082* (2013.01); *F16D 11/14* (2013.01); *F16D 13/52* (2013.01); *F16D 25/061* (2013.01); *F16H 1/28* (2013.01); *F16D 2011/006* (2013.01); *F16D 2121/04* (2013.01); *F16D 2121/14* (2013.01); *F16D 2127/06* (2013.01)

(58) Field of Classification Search
CPC .......... F16D 2011/006; F16D 2127/06; F16D 25/061

See application file for complete search history.

(56) References Cited

U.S. PATENT DOCUMENTS

| | | | | |
|---|---|---|---|---|
| 5,048,656 | A | * | 9/1991 | Braun .................... B60T 17/16 192/114 R |
| 6,948,685 | B2 | | 9/2005 | Hawthorne |
| 7,891,261 | B2 | | 2/2011 | Neelakantan |
| 8,109,376 | B2 | * | 2/2012 | Bek ..................... F16D 25/0638 192/109 R |
| 8,460,144 | B2 | | 6/2013 | Ziemer |

(Continued)

FOREIGN PATENT DOCUMENTS

WO   2015145241 A1   10/2015

*Primary Examiner* — Tisha D Lewis

(57) ABSTRACT

A clutch assembly having a first clutch member, a second clutch member axially slidable in a first axial direction to engage the first clutch member and in a second axial direction to disengage from the first clutch member, a spring biasing the second clutch member in one of the axial directions, a piston actuatable to move the second clutch member in the other of the axial directions, thereby overcoming a biasing force of the spring, and a latching device to selectively lock the piston in at least one of the first axial direction and second axial direction. The latching device includes a selectively retractable locking pin. The piston has an external surface defining a slot to receive the locking pin, thereby locking the piston in the first position or the second position. A method of operating the clutch assembly is provided.

19 Claims, 4 Drawing Sheets

(56) References Cited

U.S. PATENT DOCUMENTS

| | | |
|---|---|---|
| 2006/0040782 A1 | 2/2006 | Diemer et al. |
| 2008/0264746 A1* | 10/2008 | Simpson .............. F16D 25/0638 |
| | | 192/3.33 |
| 2008/0314711 A1* | 12/2008 | Jayaram .............. F16D 25/0638 |
| | | 192/85.34 |
| 2012/0138412 A1* | 6/2012 | Rogner ............... F16D 25/0638 |
| | | 192/85.23 |
| 2015/0068344 A1* | 3/2015 | Ziemer .................. F16D 11/14 |
| | | 74/473.36 |
| 2017/0002815 A1* | 1/2017 | Cramer .................. F04C 25/02 |
| 2017/0182886 A1* | 6/2017 | Horie .................. B60K 17/354 |

* cited by examiner

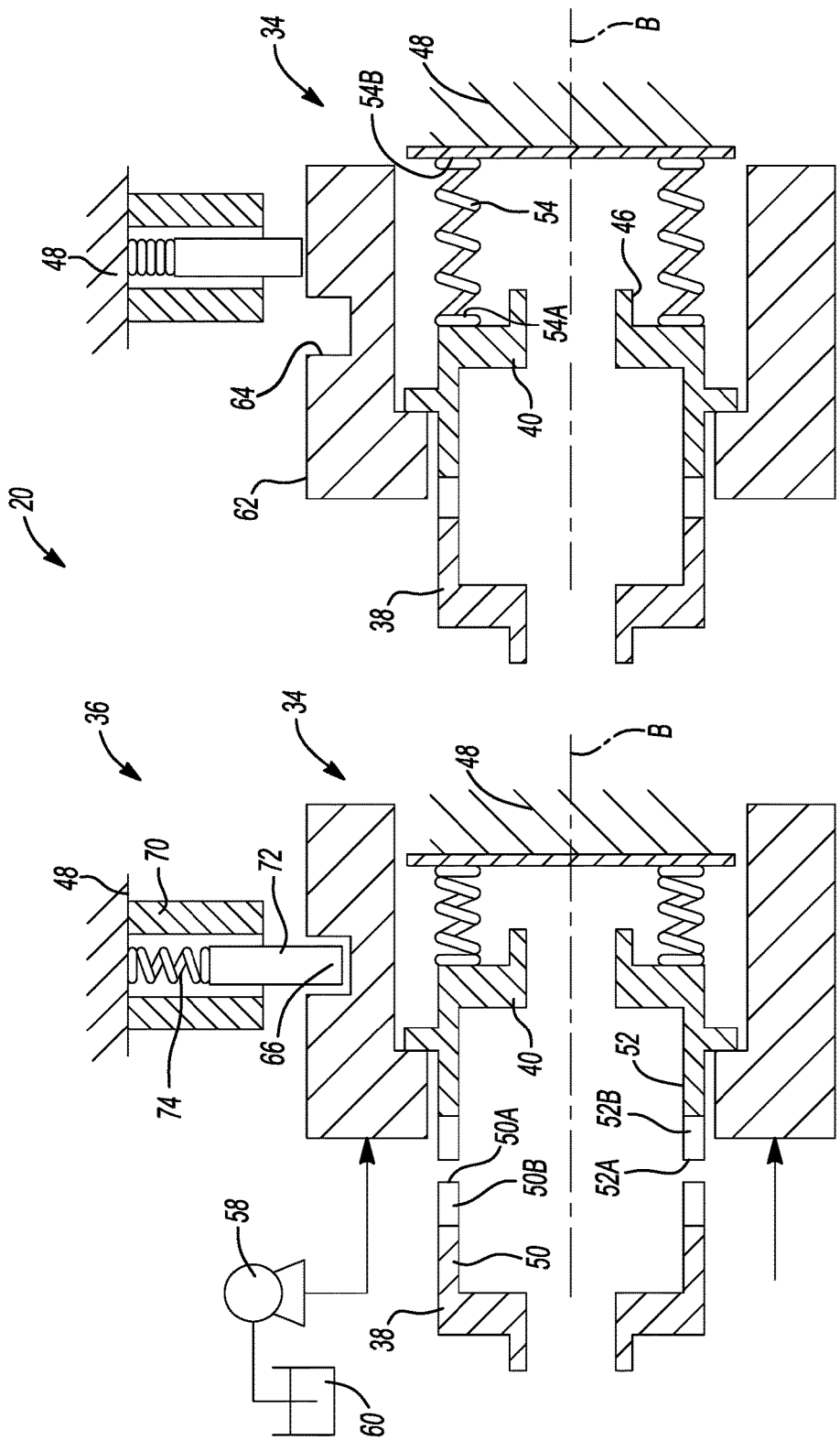

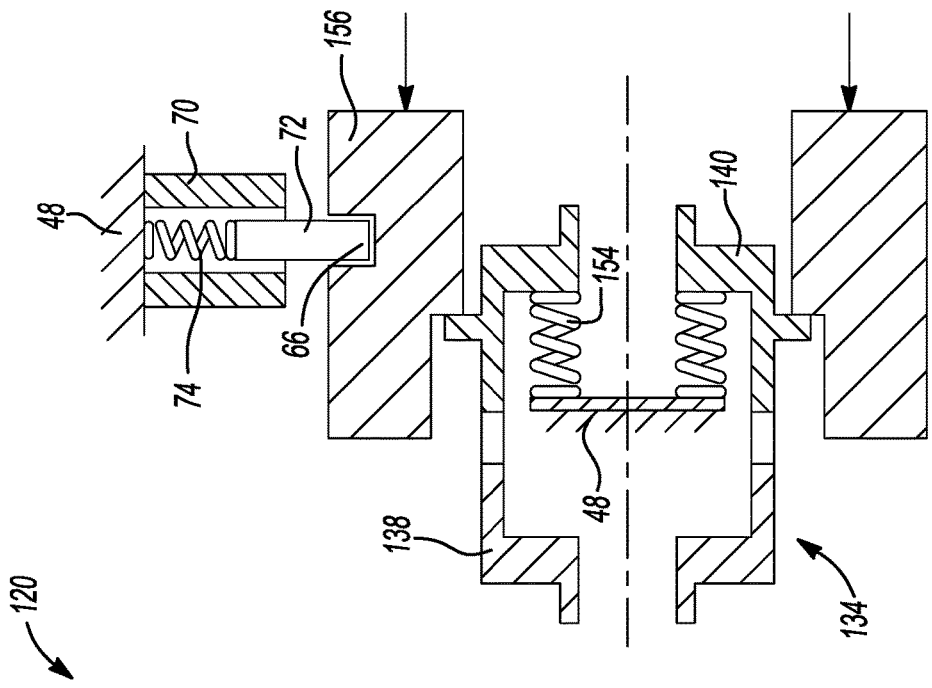
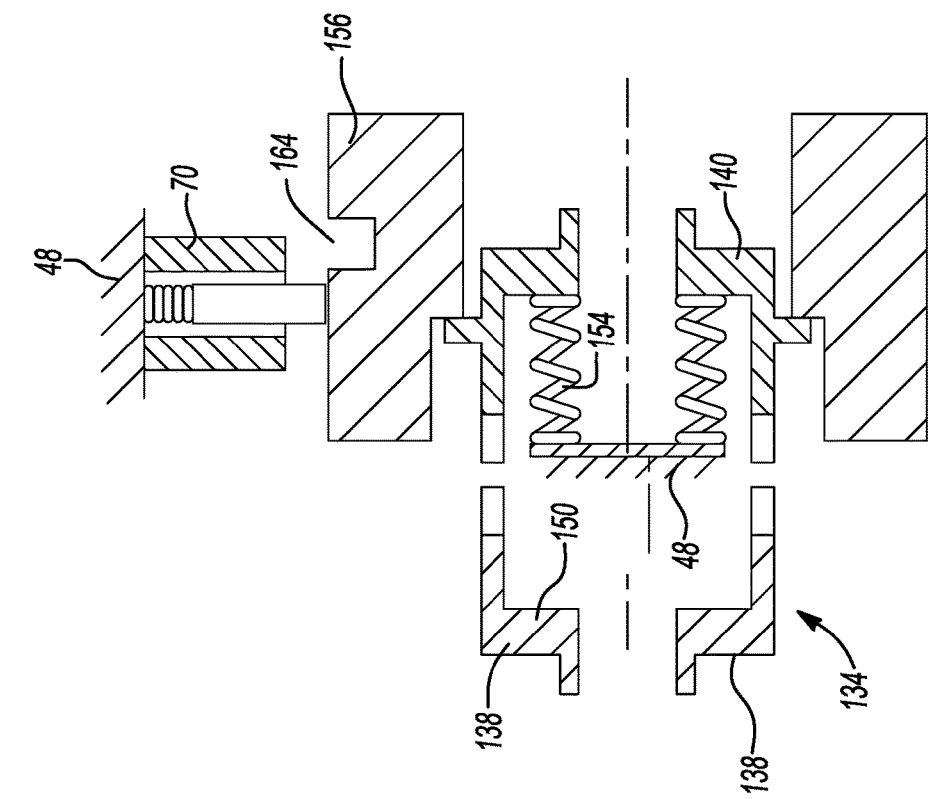
FIG. 3A
FIG. 3B

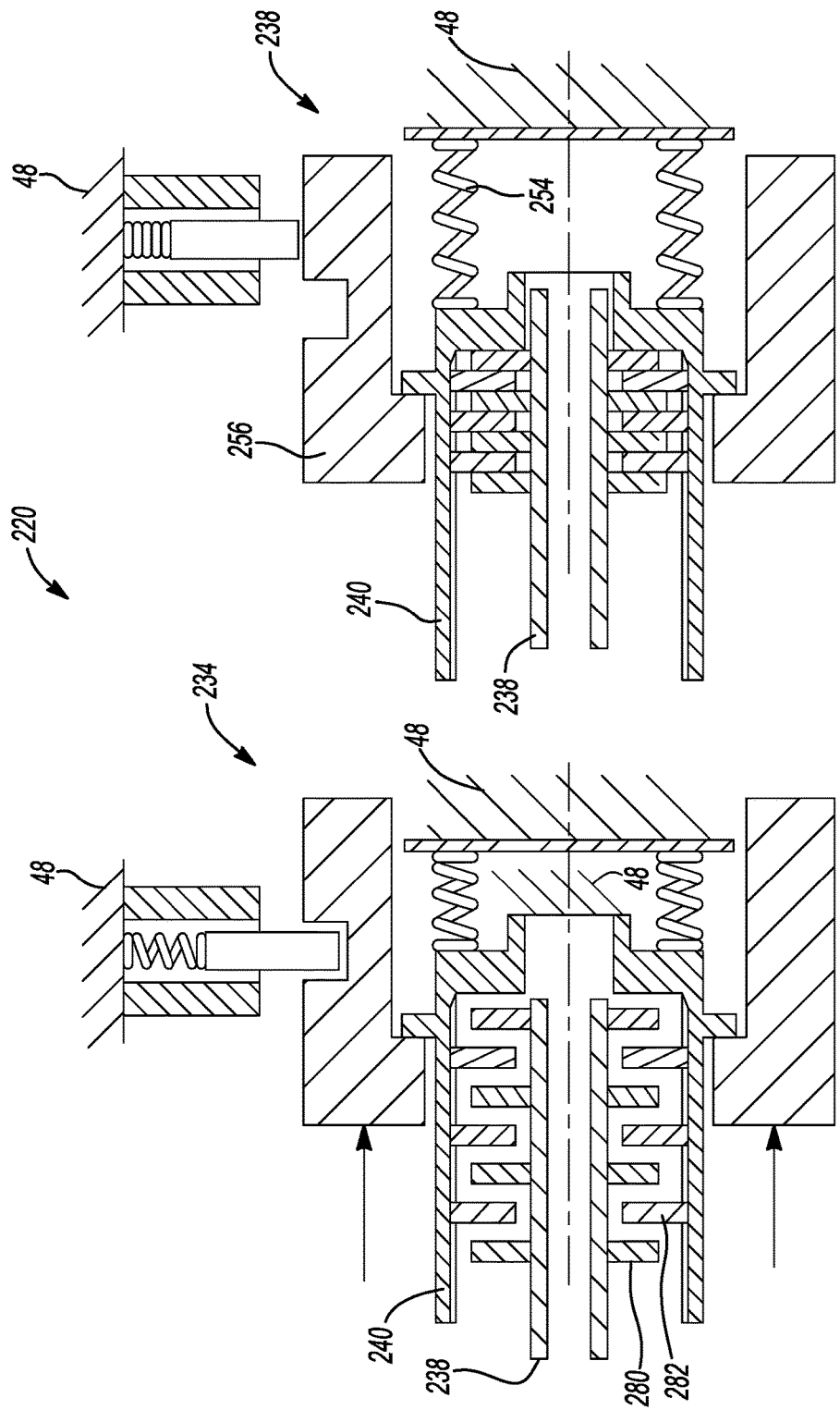

CLUTCH ASSEMBLY HAVING A HYDRAULICALLY ACTUATE PISTON AND LATCHING DEVICE

TECHNICAL FIELD

The present invention relates to transmission clutches, and more particularly, to a transmission clutch having a hydraulically actuated piston.

BACKGROUND

In powertrain systems for motor vehicles, torque-transmitting mechanisms such as clutches are used to selectively engage gear sets for the transmittal of torque from the motor through the transmission to the drive shafts to propel the vehicle. Hydraulically operated pistons are used to actuate the engagement or disengagement of the clutches.

Hydraulic pressure may be supplied to a hydraulic piston by a hydraulic fluid pump drawing hydraulic fluid from a hydraulic fluid reservoir. Upon the loss of hydraulic pressure, due to power or pump failure, the hydraulically operated piston may return to its default position resulting in the unintentional engagement or disengagement of the clutch, resulting in potential damage to the powertrain system.

Thus, there is a need for a mechanism to retain the hydraulic piston of a clutch in a predetermined position in the event of a failure of equipment or hydraulic system to prevent damage to the powertrain.

SUMMARY

A clutch assembly for a transmission is disclosed. The clutch assembly includes a first clutch member extending along a central axis; a second clutch member co-axially spaced from the first clutch member, wherein the second clutch member is axially slidable in a first axial direction to engage the first clutch member and in a second axial direction to disengage from the first clutch member; a spring biasing the second clutch member in one of the first axial direction and the second axial direction; a piston selectively actuatable to move the second clutch member in the other of the first axial direction and the second axial direction, thereby overcoming a biasing force of the spring; and a latching device to selectively lock the piston in at least one of a first position when the second clutch member is in the first axial direction and in a second position when the second clutch member is in the second axial direction.

In one aspect, the latching device includes a selectively retractable locking pin, and the piston has an external surface defining a slot to receive the locking pin, thereby locking the piston in the first position or the second position.

In another aspect, the latching device includes a latching device housing grounded to a stationary component of the transmission, a solenoid coil disposed within the housing, a metallic plunger having an end defining the locking pin disposed within the solenoid coil, wherein the metallic plunger is axially slidable moveable with respect to the housing in an extended position and a retracted position, and a biasing member urging the metallic plunger in the extended position such that the locking pin protrudes from the latching device housing. The metallic plunger moves axially in the retracted position upon energizing of the solenoid coil.

In another aspect, the first clutch member includes a distal end connected to a reactionary member of a planetary gear set and an opposite engagement end defining a first dog gear. The first clutch member is rotatable about the central axis.

In another aspect, the second clutch member is grounded to a stationary member of the transmission, such that the second clutch member is non-rotatable about the central axis. The second clutch member includes an engagement end defining a second dog gear configured to engage and lock onto the first dog gear such that the second clutch member is fixably coupled to the first clutch member.

In another aspect, the spring biases the second clutch member in the first axial direction, thereby engaging the second clutch member to the first clutch member and preventing the rotation of the first clutch member. The piston is selectively actuatable to move the second clutch member in the second axial direction, thereby overcoming a biasing force of the spring such that the second clutch member is disengaged from first clutch member and allowing the rotation of the first clutch member. The latching device selectively locks the piston in the second position in the second axial direction such that the second clutch member is maintained disengaged with the first clutch member.

In another aspect, the spring biases the second clutch member in the second axial direction, thereby dis-engaging the second clutch member to the first clutch member and allowing the rotation of the first clutch member. The piston is selectively actuatable to move the second clutch member in the first axial direction, thereby overcoming a biasing force of the spring such that the second clutch member is engaged with the first clutch member and preventing the rotation of the first clutch member. The latching device selectively locks the piston in the first position in the first axial direction such that the second clutch member is maintained disengaged with the first clutch member.

In another aspect, the first clutch member includes a distal end connected to a reactionary member of a planetary gear set, such that the first clutch member is rotatable about the central axis, and an opposite engagement end having a plurality of first clutch plates. The second clutch member is grounded to a stationary member of the transmission, such that the second clutch is non-rotatable about the central axis, and includes an engagement end defining a plurality of second clutch plates axially interspersed between the first clutch plates. The spring biases the second clutch plates in the first axial direction against the first clutch plates, thereby fixably coupling the second clutch member to the first clutch member and preventing the rotation of the first clutch member. The piston is selectively actuatable to the second clutch plates in the second axial direction, thereby overcoming a biasing force of the spring such that the second plates are disengaged from first clutch plates and allowing the rotation of the first clutch member. The latching device selectively locks the piston in the second position in the second axial direction such that the second clutch member is maintained disengaged with the first clutch member.

In another aspect, the piston is actuatable by hydraulic pressure supplied by a 12-volt hydraulic fluid pump drawing hydraulic fluid from a hydraulic fluid reservoir 60.

In another aspect, the solenoid is selectively actuatable to retract the locking pin into the locking housing, thereby releasing the piston.

A powertrain system is disclosed. The powertrain system includes a motor having a motor output shaft extending along a central axis; a planetary gear set having a planet carrier supporting a plurality of planet gears intermeshed between a sun gear and a ring gear, wherein the sun gear is coaxially connected to the input shaft; a first clutch member connected to the ring gear, wherein the first clutch member is rotatable about the central axis; a second clutch member co-axially spaced from the first clutch member, wherein the second clutch member is connected to a stationary member such that the second clutch member is non-rotational about the central axis and slidably moveable along the central axis; a spring biasing the second clutch member in a first axial direction to engage the first clutch member to prevent the rotation of the first clutch member; a piston selectively actuatable to move the second clutch member in the second axial direction overcoming a biasing force of the spring and disengaging the second clutch member from the first clutch member to allow the rotation of the first clutch member; and a latching device to selectively locks the piston in a fixed position maintaining the disengagement of the second clutch member.

In one aspect, the piston has a surface defining an aperture. The latching device includes a latching device housing connected fixed to a second stationary member, an electrically actuated solenoid coil disposed within the housing, a metallic plunger having an end defining the locking pin disposed within the solenoid coil, wherein the metallic plunger is axially slidable moveable with respect to the housing in an extended position and a retracted position, a biasing member urging the metallic plunger to extend the locking pin into the aperture of the piston, thereby locking the piston in position, and a selectively activated power supply to energize the electrically actuated solenoid coil to retract the locking pin into the locking housing, thereby releasing the piston.

In another aspect, the first clutch member includes an engagement end defining a first dog gear and the second clutch member includes an engagement end defining a second dog gear configured to engage and lock onto the first dog gear, such that the second clutch member is fixably coupled to the first clutch member. The second clutch member prevents the rotation of the first clutch member, thereby holding the ring gear stationary.

In another aspect, the first clutch member includes an engagement end having a plurality of first clutch plates and the second clutch member includes an engagement end defining a plurality of second clutch plates axially interspersed between the first clutch plates. The spring biases the second clutch plates in the first axial direction against the first clutch plates, thereby fixably coupling the second clutch member to the first clutch member and preventing the rotation of the first clutch member. The piston selectively moves the second clutch plates in the second axial direction, thereby overcoming a biasing force of the spring such that the second plates are disengaged from first clutch plates and allowing the rotation of the first clutch member.

In another aspect, the latching device selectively locks the piston in the second position in the second axial direction such that the second clutch member is maintained disengaged with the first clutch member.

In another aspect, the planet carrier is connected to a first transfer gear engaged to a second transfer gear of a differential.

A method of operating a clutch assembly of a transmission is provided. The method includes providing torque to rotate a first clutch member from a reactionary gear of a planetary gear set, wherein the first member clutch is rotated about an axis, biasing a second clutch member with a spring along a first axial direction to engage the first clutch member to prohibit the rotation of the first clutch member, wherein the second clutch member is non-rotationally grounded to a stationary member of the transmission, selectively actuating a hydraulic piston to overcome a biasing force of the spring such that the second clutch member moves in a second axial direction opposite of the first axial direction to disengage the second clutch member from the first clutch member, and selectively locking the hydraulic piston in a position to maintain the disengagement of the second clutch member from the first clutch member.

In one aspect, the step of selectively locking the hydraulic piston includes extending a locking pin into a slot defined in the surface of the piston.

In another aspect, the step of selectively actuating the hydraulic piston includes supplying sufficient hydraulic pressure to the hydraulic piston to overcome the biasing force of the spring.

In another aspect, the method further includes the step of selectively retracting the locking pin from the slot and relieving the hydraulic pressure to the hydraulic piston, thereby allowing the spring to bias the second clutch member to engage the first clutch member.

In still another aspect, the locking pin is defined by an end of a plunger disposed with a coil of a solenoid enclosed within a housing connected to a stationary member. The step of extending a locking pin into a slot includes a biasing spring urging the plunger such that the locking pin extends out of the housing and into the slot. The step of retracting the locking pin from the slot includes energizing the solenoid to retract the plunger into the housing such that the locking pin is retracted out of the slot.

BRIEF DESCRIPTION OF THE DRAWINGS

The above and other aspects will become more apparent and more readily appreciated from the following description of exemplary embodiments, taken in conjunction with the accompanying drawings in which:

FIG. 2A is a schematic illustration of an embodiment of a dog type clutch in a disengaged position;

FIG. 2B is a schematic illustration of the dog type clutch of FIG. 2A in an engaged position;

FIG. 3A is a schematic illustration of another embodiment of a dog type clutch in a disengaged position;

FIG. 3B is a schematic illustration of the dog type clutch of FIG. 3A in an engaged position;

FIG. 4A is a schematic illustration of a multi-plate type clutch in a disengaged position; and FIG. 4B is a schematic illustration of the multi-plate type clutch of FIG. 5A in an engaged position.

DETAILED DESCRIPTION

Figure 1:
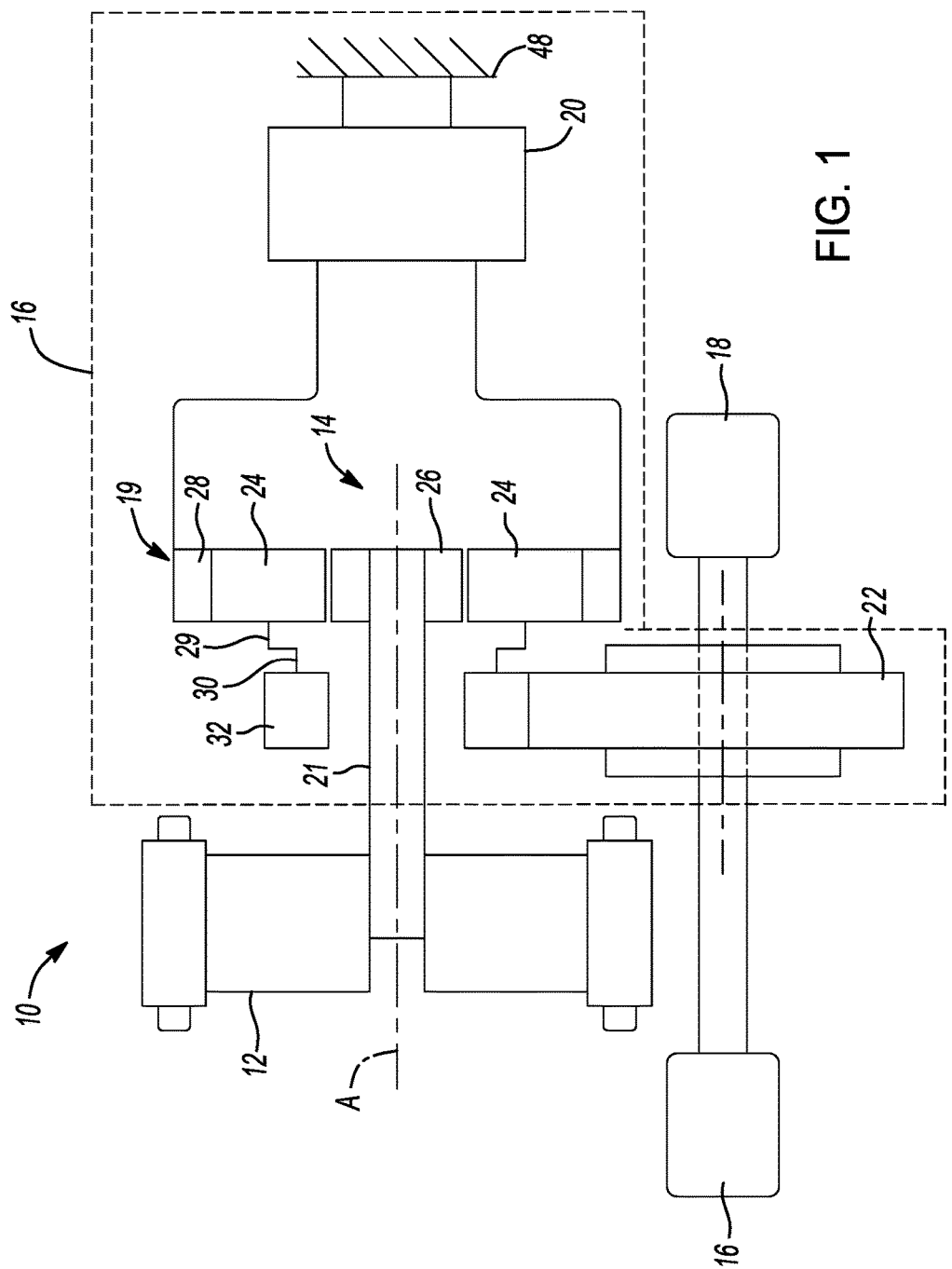
FIG. 1 is a schematic illustration of an electric powertrain system having a clutch operable to disconnect torque from an electric motor to the transmission.

The following description is merely exemplary in nature and is not intended to limit the present disclosure, applications, or uses. Referring to FIGS. 1 through 4, wherein like reference numerals correspond to like or similar elements throughout the figures, various embodiments of the invention are depicted.

FIG. 1 shows a schematic illustration of a powertrain system 10 for propelling a vehicle (not shown). The powertrain system 10 includes a motor 12 for generating a torque output and a transmission 14 for transmitting the torque output to the left half-shaft 16 and/or right half-shaft 18 of the vehicle. The transmission 14 includes a planetary gear set 19 and a clutch assembly 20 for selectively transmitting torque generated by the motor 12 to the differential 22, which distributes the torque to the half-shafts 16, 18. While the motor 12 is depicted as an electric motor 12, it should be appreciated that the motor 12 may be an internal combustion engine, a turbine, or other torque generating devices without departing from the scope of the present disclosure. While a single speed transmission 14 is depicted, it should also be appreciated that the transmission 14 may be a manual or automatic transmission where a finite number of gear ratios are provided through the selections of gear sets or a continuous variable transmission where continuous effective gear ratios are provided through the coordination of variable diameter pulleys without departing from the scope of the present disclosure.

The torque generated by the motor 12 is transmitted by an output shaft 21 extending along a central axis A to the planetary gear set 19 in the transmission 16. The clutch assembly 20 selectively holds a reactionary member of the planetary gear set 19 stationary to allow for the transmittal of torque through the transmission 14.

The planetary gear set 19 includes a plurality of planet gears 24 intermeshed between a sun gear 26 and a ring gear 28. The plurality of planet gears 24 are supported by a planet carrier 29 defining a hub 30. The sun gear 26 is coaxially continuously connected with the output shaft 21 of the motor 12 and the hub 30 is connected to a transfer gear 32. The ring gear 28 is the reactionary member that may be selectively held stationary by the clutch assembly 20. The transfer gear 32 may be engaged with additional torque transfer members or gear sets (not shown) within the transmission 14. For the simplicity of illustration and disclosure, the transfer gear 32 is shown continuously engaged with the differential 22.

When the ring gear 28 of the planetary gear set 19 is held in a stationary position and the motor 12 is generating torque, the output shaft 21 turns the sun gear 26 causing the planet gears 24 to revolve around the sun gear 26 resulting in the rotation of the plant carrier 29. The rotation of the planet carrier 29 results in the rotation of the transfer gear 32 extending from the hub 30 of the planet carrier 29. When the ring gear 28 is released and allowed to rotate freely with the sun gear 26 and planet gears 24, there is no output of torque from the planetary gear set 19 resulting in the transmission 14 being in a neutral condition. In other words, torque flows from the motor 12 through the output shaft 21, planetary gear set 19, and ultimately to the drive shafts 16, 18 when the reactionary ring gear 28 of the planetary gear set 19 is held in a stationary non-rotating position. When the reactionary ring gear 28 is released and allowed to freely rotate together with the sun gear 26 and planet gears 24, torque is not transmitted through the planetary gear set 19.

The clutch assembly 20 includes a hydraulically actuated clutch 34 and a latching device 36. In the present embodiment, the hydraulically actuated clutch 34 shown in FIG. 2 is a dog clutch 34 having a rotatable first clutch member 38 connected to the reactionary ring gear 28 and a non-rotatable second clutch member 40 connected to a stationary component of the transmission 14. FIG. 2A shows the dog clutch 34 in a disengaged state where the second clutch member 40 is disengaged from the first clutch member 38, thereby allowing the reactionary ring gear 28 to rotate freely. FIG. 2B shows the dog clutch 34 in an engaged state where the second clutch member 40 is engaged to the first clutch member 38, thereby preventing the rotation of the first clutch member 38, resulting in the holding of the reactionary ring gear 28 stationary.

The first clutch member 38 is rotatable about a central axis B and includes an attachment end 42 connected to the reactionary ring gear 28 of the planetary gear set 19. The second clutch member 40 include an attachment end 44 slidably engaged to a spline 46 that is fixably connected, or grounded, to a stationary component of the transmission 48, such as the transmission housing 48. The second clutch member 40 is not rotatable; however, the second clutch member 40 is slidably movable in a first axial direction on the spline 46 to engage the first clutch member 38 and in a second axial direction to disengage from the first clutch member 38. When the two members are engaged, the non-rotatable second clutch member 40 prevents the first clutch member 38 from rotating about the central axis B.

The first clutch member 38 includes an engagement end 50 defining a first dog gear 50 having a plurality of crowns 50A and recesses 50B between the crowns. The second clutch member 40 includes an engagement end 52 defining a second dog gear 52 having plurality of crowns 52A and recesses 52B complementary to the crowns 50A and recesses 50B of the first dog gear 50. The first and second dog gears 50, 52 are configured such that the first dog gear 50 locks onto the second dog gear 52 upon engagement, thereby solidly connecting the first clutch member 38 to the second clutch member 40.

The dog clutch includes at least one spring 54 having a first end 54A in contact with the second clutch member 40 and a second end 54B in contact with a stationary component of the transmission 14. The spring 54 continuously biases the second clutch member 40 in the first axial direction to engage the first clutch member 38. A hydraulically actuated piston 56 is provided to selectively move the second clutch member 40 in the second axial direction to disengage from the first clutch member 38 when sufficient hydraulic pressure is provided to the hydraulic piston 56 to overcome the biasing force of the spring 54. The hydraulic pressure may be reduced or eliminated to allow the biasing force of the spring 54 to urge the second clutch member 40 to engage the first clutch member 38.

Hydraulic pressure may be provided by a 12V hydraulic fluid pump 58, powered by the vehicle's battery or generator (not shown), by pumping hydraulic fluid from an onboard reservoir 60 into the hydraulic piston 56. Upon a power failure or pump failure, the dog clutch 34 fails in the engaged position (Shown in FIG. 2B) due to the loss of hydraulic pressure. This may cause damage to transmission 14 during high spin conditions. To prevent the clutch from returning to the engaged position and causing potential damage to the powertrain upon a loss of hydraulic pressure, the latching device 36 is provided in the clutch assembly 20 to retain the hydraulically actuated piston 56 in a predetermined position.

An external surface 62 of the hydraulic piston 56 defines a recess 64 or slot 64. When the piston 56 has moved the second clutch member 40 axially apart from the first clutch member 38, a locking pin 66 is inserted into the slot 64, thereby locking the hydraulic piston 56 into position. The locking pin 66 extends from the electrically operated latching device 36, which is connected to a stationary component of the transmission 14, such as the transmission housing 48. The latching device 36 includes a housing 68 having a solenoid 70 and a metallic plunger 72 disposed within a coil of the solenoid 70. The metallic plunger 72 includes an end defining the locking pin 66. The metallic plunger 72 is axially slidably with respect to the housing 68 in an extended position and a retracted position. A biasing member 74 is disposed in the housing 68 to urge the metallic plunger 72 in an extended position, such that the pin 66 protrudes from the latching device housing 68.

An electric current may be sent through the coil of the solenoid 70, thereby energizing the coil, to induce a magnetic force to retract the metallic plunger 72 into the housing 68 overcoming the biasing force of the spring or biasing member 74. Once the plunger 72 is retracted into the housing 68, the hydraulic piston 56 is free to move axially, but subject to the balancing of forces between the hydraulic pressure acting against the piston 56 and the biasing member 74. In the unlocked position as shown in FIG. 2B, the locking plunger 72 may be further retracted into the housing 68 such that the plunger 72 does not drag on the surface 62 of the hydraulic piston 56 as the hydraulic piston 56 moves back into position.

FIG. 3 shows an alternative embodiment of the dog clutch of FIG. 2. FIG. 3A shows the dog clutch 134 in a non-engaged state where the second clutch member 140 is axially spaced from the first clutch member 138; thereby allowing the ring gear 28 to freely rotate and no torque is outputted by the planetary gear set 19. FIG. 3B shows the dog clutch 134 in an engaged state; thereby holding the ring gear 28 stationary and allowing the torque to flow from the motor 12 through the differential 22.

In contrast to the embodiment shown in FIG. 2, the spring 154 of the clutch 234 of FIG. 3 continuously biases the second clutch member 140 in the second axial direction to dis-engage the second clutch member 140 from the first clutch member 138. The hydraulically actuated piston 156 is provided to selectively move the second clutch member 140 in the first axial direction to engage from the first clutch member 138 when sufficient hydraulic pressure is provided to the hydraulic piston 156 to overcome the biasing force of the spring 154. The hydraulic pressure may be reduced or eliminated to allow the biasing force of the spring 154 to urge the second clutch member 140 to disengage from the first clutch member 138.

Referring to FIG. 3B, when the piston 156 has moved the second clutch member 140 axially to engage first clutch member 138, the selectively retractable locking pin 66 of the latching device 36 of FIG. 2 is inserted into the slot 164, thereby locking the hydraulic piston 156 into position.

In an alternate embodiment, the hydraulically actuated clutch 34 is shown in FIG. 4 as a multi-plate type clutch 234 having a rotatable first clutch member 238 connected to the ring gear 28 of the planetary gear assembly and a non-rotatable second clutch member 240 connected to the transmission housing 48. A first set of clutch plates 280 extends from the first clutch member 38 and second set of clutch plates 282 extends from the second clutch member 240. Plates from the first set of plates 280 are axially interspersed between plates from the second set of plates 282. The biasing spring 254 urges the second clutch plates 282 in the first axial direction against the first clutch plates 280; thereby fixably coupling the second clutch member 240 to the first clutch member 238 and preventing the rotation of the first clutch member 238. The piston 256 selectively moves the second clutch plates in the second axial direction, thereby overcoming the biasing of the spring 254 such that the second plates 282 are disengaged from first clutch plates 280 and allowing the rotation of the first clutch member 238.

Similar to the embodiment shown in FIG. 2, when the piston 256 has moved the second clutch member 240 axially apart from the first clutch member 38, a selectively locking pin 66 of the locking device shown in FIG. 2 is inserted into the slot 264, thereby locking the hydraulic piston 256 into position.

It should be understood that the invention is not limited to the exact embodiment or construction which has been illustrated and described but that various changes may be made without departing from the spirit and the scope of the invention.

The following is claimed:

1. A clutch assembly for a transmission, comprising:
a first clutch member extending along a central axis;
a second clutch member co-axially spaced from the first clutch member, wherein the second clutch member is axially slidable in a first axial direction to engage the first clutch member and in a second axial direction to disengage from the first clutch member;
a spring biasing the second clutch member in one of the first axial direction and the second axial direction;
a piston selectively actuatable to move the second clutch member in the other of the first axial direction and the second axial direction, thereby overcoming a biasing force of the spring; and
a latching device to selectively lock the piston in at least one of a first position when the second clutch member is in the first axial direction and in a second position when the second clutch member is in the second axial direction, wherein the latching device includes a selectively retractable locking pin and the piston has an external surface defining a slot to receive the locking pin, thereby locking the piston in the first position or the second position.

2. The clutch assembly of claim 1, wherein the latching device further comprises:
a latching device housing grounded to a stationary component of the transmission,
a solenoid coil disposed within the housing,
a metallic plunger having an end defining the locking pin disposed within the solenoid coil, wherein the metallic plunger is axially slidable moveable with respect to the housing in an extended position and a retracted position, and
a biasing member urging the metallic plunger in the extended position such that the locking pin protrudes from the latching device housing; and
wherein the metallic plunger moves axially in the retracted position upon energizing of the solenoid coil.

3. The clutch assembly of claim 1, wherein the first clutch member includes a distal end connected to a reactionary member of a planetary gear set, such that the first clutch member is rotatable about the central axis, and an opposite engagement end defining a first dog gear; and wherein the second clutch member is grounded to a stationary member of the transmission, such that the second clutch member is non-rotatable about the central axis, and includes an engagement end defining a second dog gear configured to engage and lock onto the first dog gear such that the second clutch member is fixably coupled to the first clutch member.

4. The clutch assembly of claim 3,
wherein the spring biases the second clutch member in the first axial direction; thereby engaging the second clutch member to the first clutch member and preventing the rotation of the first clutch member;
wherein the piston is selectively actuatable to move the second clutch member in the second axial direction, thereby overcoming a biasing force of the spring such that the second clutch member is disengaged from first clutch member and allowing the rotation of the first clutch member; and
wherein the latching device selectively locks the piston in the second position in the second axial direction such that the second clutch member is maintained disengaged with the first clutch member.

5. The clutch assembly of claim 3,
wherein the spring biases the second clutch member in the second axial direction; thereby dis-engaging the second clutch member to the first clutch member and allowing the rotation of the first clutch member;

wherein the piston is selectively actuatable to move the second clutch member in the first axial direction, thereby overcoming a biasing force of the spring such that the second clutch member is engaged with the first clutch member and preventing the rotation of the first clutch member; and wherein the latching device selectively locks the piston in the first position in the first axial direction such that the second clutch member is maintained disengaged with the first clutch member.

6. The clutch assembly of claim 1, wherein the first clutch member includes a distal end connected to a reactionary member of a planetary gear set, such that the first clutch member is rotatable about the central axis, and an opposite engagement end having a plurality of first clutch plates;

wherein the second clutch member is grounded to a stationary member of the transmission, such that the second clutch is non-rotatable about the central axis, and includes an engagement end defining a plurality of second clutch plates axially interspersed between the first clutch plates;

wherein the spring biases the second clutch plates in the first axial direction against the first clutch plates; thereby fixably coupling the second clutch member to the first clutch member and preventing the rotation of the first clutch member;

wherein the piston is selectively actuatable to the second cutch plates in the second axial direction, thereby overcoming a biasing force of the spring such that the second plates are disengaged from first clutch plates and allowing the rotation of the first clutch member; and wherein the latching device selectively locks the piston in the second position in the second axial direction such that the second clutch member is maintained disengaged with the first clutch member.

7. The clutch assembly of claim 2, wherein the piston is actuatable by hydraulic pressure supplied by a 12-volt hydraulic fluid pump drawing hydraulic fluid from a hydraulic fluid reservoir.

8. The clutch assembly of claim 2, wherein the solenoid is selectively actuatable to retract the locking pin into the locking housing, thereby releasing the piston.

9. A powertrain system comprising:

a motor having a motor output shaft extending along a central axis;

a planetary gear set having a planet carrier supporting a plurality of planet gears intermeshed between a sun gear and a ring gear, wherein the sun gear is coaxially connected to the motor output shaft;

a first clutch member connected to the ring gear, wherein the first clutch member is rotatable about the central axis;

a second clutch member co-axially spaced from the first clutch member, wherein the second clutch member is connected to a stationary member such that the second clutch member is non-rotational about the central axis and slidably moveable along the central axis;

a spring biasing the second clutch member in a first axial direction to engage the first clutch member to prevent the rotation of the first clutch member;

a piston selectively actuatable to move the second clutch member in the second axial direction overcoming a biasing force of the spring and disengaging the second clutch member from the first clutch member to allow the rotation of the first clutch member; and a latching device to selectively lock the piston in a fixed position maintaining the disengagement of the second clutch member.

10. The powertrain system of claim 9, wherein the piston has a surface defining an aperture, wherein the latching device comprises:

a latching device housing connected fixed to a second stationary member, an electrically actuated solenoid coil disposed within the housing, a metallic plunger having an end defining the locking pin disposed within the solenoid coil, wherein the metallic plunger is axially slidable moveable with respect to the housing in an extended position and a retracted position, a biasing member urging the metallic plunger to extend the locking pin into the aperture of the piston, thereby locking the piston in position, and a selectively activated power supply to energize the electrically actuated solenoid coil to retract the locking pin into the locking housing, thereby releasing the piston.

11. The powertrain system of claim 10, wherein the first clutch member includes an engagement end defining a first dog gear, and wherein the second clutch member includes an engagement end defining a second dog gear configured to engage and lock onto the first dog gear such that the second clutch member is fixably coupled to the first clutch member, such that the second clutch member prevents the rotation of the first clutch member, thereby holding the ring gear stationary.

12. The powertrain system of claim 10, wherein the first clutch member includes an engagement end having a plurality of first clutch plates;

wherein the second clutch member includes an engagement end defining a plurality of second clutch plates axially interspersed between the first clutch plates;

wherein the spring biases the second clutch plates in the first axial direction against the first clutch plates; thereby fixably coupling the second clutch member to the first clutch member and preventing the rotation of the first clutch member; and wherein the piston selectively moves the second cutch plates in the second axial direction, thereby overcoming a biasing force of the spring such that the second plates are disengaged from first clutch plates and allowing the rotation of the first clutch member.

13. The powertrain system of claim 9, wherein the latching device selectively locks the piston in the second position in the second axial direction such that the second clutch member is maintained disengaged with the first clutch member.

14. The powertrain system of claim 13, wherein the planet carrier is connected to a first transfer gear engaged to a second transfer gear of a differential.

15. A method of operating a clutch assembly of a transmission, comprising the steps of:

providing torque to rotate a first clutch member from a reactionary gear of a planetary gear set, wherein the first member clutch is rotated about an axis;

biasing a second clutch member with a spring along a first axial direction to engage the first clutch member to prohibit the rotation of the first clutch member, wherein the second clutch member is non-rotationally grounded to a stationary member of the transmission;

selectively actuating a hydraulic piston to overcome a biasing force of the spring such that the second clutch member moves in a second axial direction opposite of the first axial direction to disengage the second clutch member from the first clutch member; and selectively locking the hydraulic piston in a position to maintain the disengagement of the second clutch member from the first clutch member.

16. The method of claim 15, wherein the step of selectively locking the hydraulic piston includes extending a locking pin into a slot defined in a surface of the hydraulic piston.

17. The method of claim 16, wherein the step of selectively actuating the hydraulic piston includes supplying sufficient hydraulic pressure to the hydraulic piston to overcome the biasing force of the spring.

18. The method of claim 17, further include the step of selectively retracting the locking pin from the slot and relieving the hydraulic pressure to the hydraulic piston; thereby allowing the spring to bias the second clutch member to engage the first clutch member.

19. The method of claim 18,
wherein the locking pin is defined by an end of a plunger disposed with a coil of a solenoid enclosed within a housing connected to a stationary member;
wherein the step of extending a locking pin into a slot includes a biasing spring urging the plunger such that the locking pin extends out of the housing and into the slot; and
wherein the step of retracting the locking pin from the slot includes energizing the solenoid to retract the plunger into the housing such that the locking pin is retracted out of the slot.

* * * * *